Figure 1:
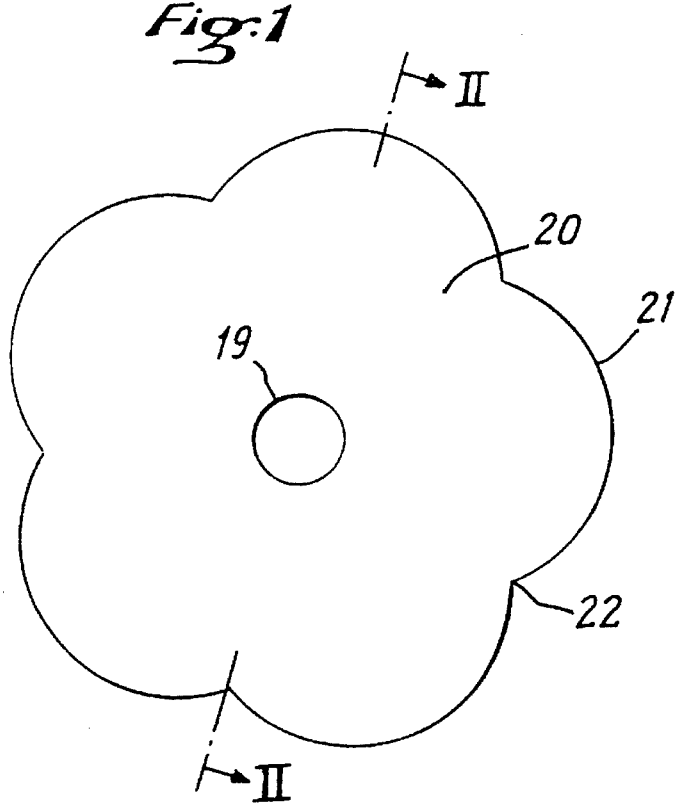

United States Patent [19]

Javerlhac

[11] Patent Number: 5,495,897
[45] Date of Patent: Mar. 5, 1996

[54] PLOW DISK OF THE TYPE INTENDED TO BE MOUNTED FREE IN ROTATION ON A SHAFT INTEGRAL WITH THE FRAME OF A PLOW

[76] Inventor: Jean-Charles Javerlhac, Les Rosiers - Giumps, 16300 - Barbezieux, France

[21] Appl. No.: 78,039

[22] Filed: Jun. 18, 1993

Related U.S. Application Data

[63] Continuation of Ser. No. 773,879, Dec. 30, 1991, abandoned.

[30] Foreign Application Priority Data

May 2, 1989 [FR] France .................... 89 05815
Nov. 3, 1989 [FR] France .................... 89 14424

[51] Int. Cl.⁶ ......................... A01B 15/16; A01B 23/06
[52] U.S. Cl. .................... 172/604; 172/558; 172/599
[58] Field of Search .................... 172/604, 15, 531, 172/558, 532; 111/163, 167–169; 56/255, 295, 11, 256

[56] References Cited

U.S. PATENT DOCUMENTS

| 323,343 | 7/1885 | LaDow | 172/604 |
|---|---|---|---|
| 380,422 | 4/1888 | Clark | 111/169 |
| 536,094 | 3/1895 | Newton | 172/604 |
| 672,536 | 4/1901 | Newton | 172/604 |
| 882,353 | 3/1908 | Speirs | 172/604 |
| 1,060,280 | 4/1913 | Olson | 172/604 |
| 1,113,241 | 10/1914 | Niesz | 172/604 |
| 1,158,110 | 10/1915 | Cook | 172/604 |
| 2,034,579 | 3/1936 | Hurtig . | |
| 2,277,622 | 3/1942 | White | 111/169 |
| 2,528,897 | 11/1950 | Mayfield | 56/295 |
| 2,539,053 | 1/1951 | Blackledge . | |
| 2,704,970 | 3/1955 | Greaves | 111/169 |
| 2,746,371 | 5/1956 | Cook | 172/604 |
| 2,805,534 | 9/1957 | Robertson | 172/558 |
| 2,949,968 | 8/1960 | Stoner | 172/558 |
| 3,005,501 | 10/1961 | Frank | 172/604 |
| 3,122,111 | 2/1964 | Taylor et al. | 172/604 |

FOREIGN PATENT DOCUMENTS

| 455691 | 8/1913 | European Pat. Off. . | |
|---|---|---|---|
| 0162197 | 11/1985 | European Pat. Off. . | |
| 1391954 | 1/1964 | France | 172/604 |
| 698859 | 11/1965 | Italy | 172/604 |
| 832431 | 4/1960 | United Kingdom | 172/604 |
| 2023390 | 1/1980 | United Kingdom | 56/295 |

*Primary Examiner*—Randolph A. Reese
*Assistant Examiner*—Spencer Warnick
*Attorney, Agent, or Firm*—Hoffman, Wasson & Gitler

[57] ABSTRACT

This invention relates to a plow disk intended to be mounted with several others free in rotation around a shaft integral with the frame of a plow, the shaft being inclined in relation to the direction of advance of the plow so as to impart a rotation of movement to the disks.

11 Claims, 3 Drawing Sheets

PLOW DISK OF THE TYPE INTENDED TO BE MOUNTED FREE IN ROTATION ON A SHAFT INTEGRAL WITH THE FRAME OF A PLOW

This is a continuation of application Ser. No. 07/773,879 filed on Dec. 30, 1991, now abandoned International Application PCT/FR90/00314 filed on May 2, 1990 and which designated the U.S.

This invention relates to a plow disk intended to be mounted with several others free in rotation around a shaft integral with the frame of a plow, said shaft being inclined in relation to the direction of advance of the plow so as to impart a rotation movement to the disks.

These disks of known type are generally in the shape of a portion of a sphere of steel centered on their axis of rotation. They therefore form a cup at the bottom of which is their hub and thereby cause a partial turning over of the earth during the plowing.

These plow disks as described in document U.S. Pat. No. 2,034,579 comprise notches on their periphery. They are not entirely satisfactory because, on the one hand, they have a tendency to collect and catch on the plants that are growing on the surface of the plowed ground and, on the other hand, the surface of the plowed ground does not always appear with the structure that it is desired to impart to it.

Another drawback of known plow disks of said type resides in the fact that they form a sole in the ground, i.e., they create a sharp separation surface between the part of the ground which is plowed and which is consequently loose, and the unplowed and consequently hard part.

Known plow disks of said type also exhibit the drawback of forming large-sized clods of earth, because the ground is attacked along parallel lines in the direction of advance of the plow.

This invention aims particularly at eliminating these drawbacks.

The invention has as its object a plow disk of said type, characterized by the fact that its periphery is in the form of a series of convex lobes.

A line of attack of the sinuous soil results which expands the soil before turning it over, thus limiting the formation of clods. A consequence of the shape of the disk as shown in FIG. 1 is that when the disk rotates around a horizontal axis, which makes an angle less than 90° which the direction of displacement of the plow, as it is usual for plows, the line, along which the periphery of the disk cuts the soil is sinuous. Therefore, the plow has less tendency to form large size clods of earth.

To make possible a good turning over of the soil, the lobes meet preferably in sharp angles, optionally slightly rounded to prevent a weakness of the metal at the junction between the various lobes.

According to an embodiment of the invention, the generatrix of the plow disk consists of a curve or a concave polygon whose one end is on the periphery of the disk and whose other end is near its center, said generatrix being entirely located on a single side of its tangent which is perpendicular to the axis of rotation of the disk, said tangent being in contact with the generatrix at a point away from its ends. With the exception of the multiple lobed periphery, the disk according to the invention, is a surface of revolution. The generatrix of a surface of revolution is the line which by rotation generates the surface of revolution. The generatrix of the disk in the present invention is the half cross-section of the disk with a plane containing the axis of rotation of said disk.

This particular shape of the disk makes it possible to increase considerably its diameter while correctly folding back the upper part of the earth which is plowed.

A better release of the plants growing on the surface of the plowed ground also results from it and therefore a better penetration and an easier rotation of the disks which thus work under much better conditions.

The two ends of the concave generatrix of the disk can be found in the same plane but it can be otherwise and according to a preferred embodiment, the end of the generatrix which is located in the vicinity of the axis of the disk is offset to the front in the direction of the advance of the plow.

By way of example, a plow disk according to the invention can be in the form of a surface similar to a torus portion delimited by a plane perpendicular to its axis or preferably by two planes, the plane delimiting the outside periphery of the disk being—in relation to the direction of working—in back of the plane perpendicular to the axis which delimits the internal periphery of the disk in the vicinity of its hub.

This invention also has as its object a plow characterized by the fact that it comprises disks exhibiting the characteristics described above, and more particularly such a plow in which the lobes of two adjacent disks are offset angularly by a predetermined value, for example by an angle between about 10° and 30°, and preferably between 15° and 20°.

Figure 4:
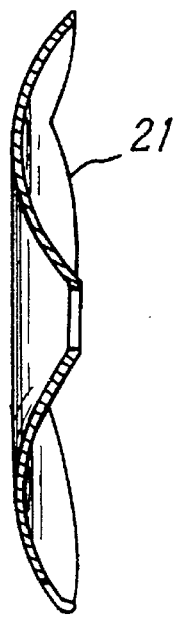
Figure 5:
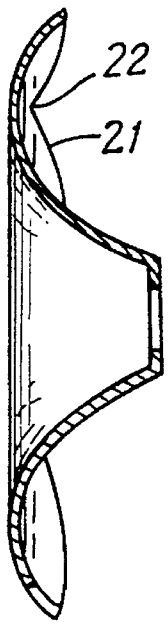
Figure 6:
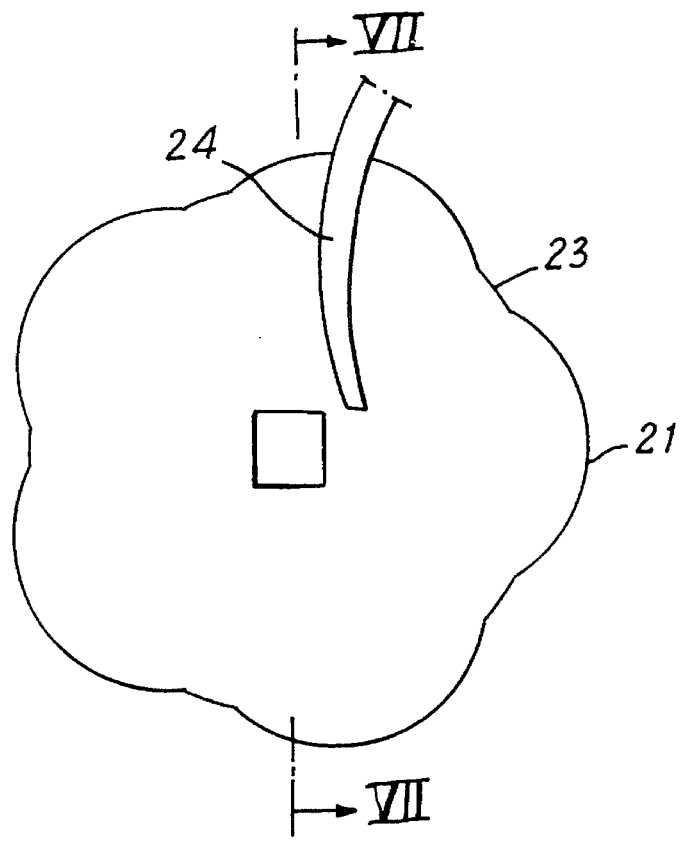
Figure 7:
Figure 8:
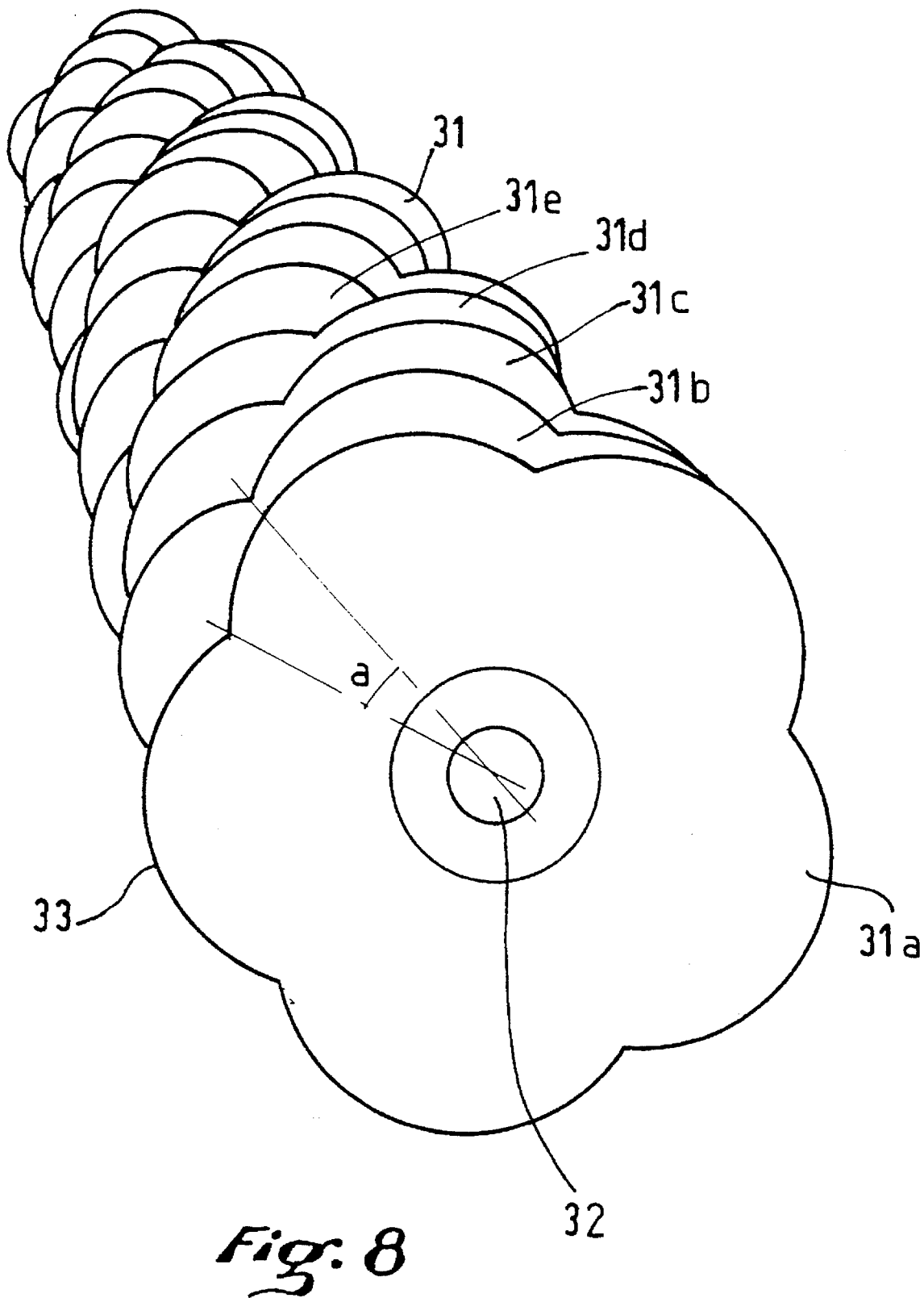

Now, by way of nonlimiting example, some particular embodiments of the invention will be given with reference to the accompanying drawing in which: accompanying drawing in which:

FIG. 1 is a view in elevation of an embodiment of the plow disk according to the invention, FIGS. 2 to 5 are views in section along II—II of four variant embodiments of the disk of FIG. 1, FIG. 6 is a view in elevation of a variant of FIG. 1 which comprises a scraper, FIG. 7 is a view in section along VII—VII of FIG. 6, and FIG. 8 represents a plow equipped with disks according to the invention.

The plow disk of FIG. 1 comprises at its central part a pierced plate (19) making it possible to mount it in the known way on a shaft integral with the frame of a plow, a shaft around. which it can freely turn.

Plow disk 20 according to the invention (seen in elevation parallel to its axis) comprises on its periphery a series of lobes 21 that are convex outward and meet in sharp angles at 22.

Figure 2:
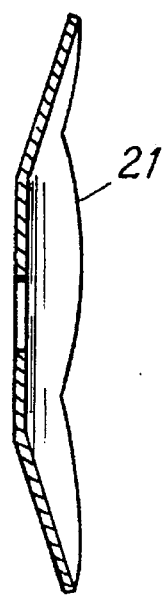
Figure 3:
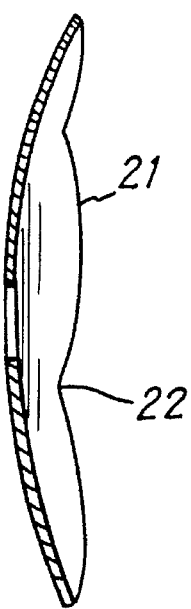

The plow disk 20 of FIG. 2 is in the shape of a truncated cone and the plow disk of FIG. 3 is dish-shaped.

The plow disk of FIG. 4 is in the shape of a hollow half taurus, and the plow disk of FIG. 5 has a toroidal half section, the central part of which projects more than the central part of the disk shown in FIG. 4.

In the embodiment of FIG. 6, lobes 21 are connected by circular parts 23 which prevent weakening the plow disk.

In this embodiment, there is further provided a scraper 24 mounted on the frame of the plow. This scraper exhibits at the same time a concavity seen parallel to the axis of rotation as in FIG. 6 and perpendicular to this axis as in FIG. 7.

This double concavity gives scraper 24 a better effectiveness to throw off the earth hooked on the plow disk out of the way of the latter, and thus makes it possible for it to perform optimal work.

The disks described above can be made, for example, by forming or by molding, and have a diameter between 45 cm and 150 cm or more.

A disk set 31 is seen in FIG. 8, mounted integral with a rotation shaft 32.

Shaft 32 is mounted free in rotation on the frame (not shown) of the plow, so as to be inclined in relation to its direction of advance.

Each disk, in the present case, exhibits five adjacent convex lobes 33.

It is seen that two adjacent disks, for example disks 31a and 31b are offset by an angle a which, in the present case, is approximately equal to 18°.

This offsetting of 18°, associated with the fact that the disks comprise five lobes, causes the position of the disks on shaft 32 to be identical to itself every four disks, two disks 31a and 31e having the same angular offset being separated by three disks 31b, 31c, and 31d.

Consequently, every 18° of rotation of the set of disks 31, one disk in four attacks the ground, thus rendering the operation of the plow almost without vibration.

I claim

1. A plow disk for being mounted on a frame of a plow, said disk undergoing self-rotation during displacement of said plow on the ground, a central part of the disk being able to be mounted on a rotation shaft, the periphery of said disk being constituted by a plurality of substantially circular convex lobes, each of said lobes meeting adjacent lobes by a slightly rounded apex.

2. A plow disk according to claim 1, having substantially the shape of a truncated cone.

3. A plow comprising a plurality of disks according to claim 1, further comprising a scraper located in the vicinity of each of said plurality of disks, on the side acting on the ground.

4. A plow according to claim 3, wherein lobes of two adjacent disks are angularly offset.

5. A plow according to claim 4, wherein two adjacent disks are offset by an angle of between approximately 10 and 30°.

6. A plow according to claim 5, wherein two adjacent disks are offset by an angle between approximately 15 and 20°.

7. A plow disk according to claim 1, having the shape of a hollow half-torus.

8. A plow disk according to claim 7, wherein the periphery and the central part of the disk are located substantially in the same plane perpendicular to the axis of rotation of the disk.

9. A plow disk according to claim 1, wherein half a cross-section of the disk is toroidal.

10. A plow disk according to claim 9, wherein the periphery of the disk is located in a plane perpendicular to the axis of the disk which is substantially different from a plane perpendicular to the axis of the disk containing the central part of the disk.

11. A plow disk according to claim 1, having a dish shape.

* * * * *